United States Patent
Datcuk, Jr.

(10) Patent No.: US 6,827,306 B1
(45) Date of Patent: Dec. 7, 2004

(54) PUSH TO TURN LOCKING PRESET KNOB FOR FISHING REEL

(75) Inventor: Peter T. Datcuk, Jr., Sewell, NJ (US)

(73) Assignee: Penn Fishing Tackle Manufacturing, Philadelphia, PA (US)

( * ) Notice: Subject to any disclaimer, the term of this patent is extended or adjusted under 35 U.S.C. 154(b) by 0 days.

(21) Appl. No.: 10/624,807

(22) Filed: Jul. 22, 2003

(51) Int. Cl.[7] .............................................. A01K 89/01
(52) U.S. Cl. ...................... 242/303; 242/245; 242/306
(58) Field of Search ............................. 242/244–246, 242/290, 302–306

(56) References Cited

U.S. PATENT DOCUMENTS

| | | | | |
|---|---|---|---|---|
| 5,560,562 A | * | 10/1996 | Hartmann | 242/255 |
| 5,564,640 A | * | 10/1996 | Egasaki et al. | 242/246 |
| 5,788,172 A | * | 8/1998 | Rosa et al. | 242/240 |
| 5,904,309 A | * | 5/1999 | Takeuchi | 242/243 |
| 6,123,280 A | * | 9/2000 | Yuen et al. | 242/247 |
| 6,152,390 A | * | 11/2000 | Datcuk, Jr. | 242/270 |
| 6,422,497 B1 | * | 7/2002 | Kyon | 242/267 |
| 6,578,785 B1 | * | 6/2003 | Hong | 242/245 |
| 2001/0002684 A1 | * | 6/2001 | Hitomi et al. | 242/322 |

* cited by examiner

Primary Examiner—Emmanuel Marcelo
(74) Attorney, Agent, or Firm—Frank J. Benasutti

(57) ABSTRACT

A locking preset mechanism for a fishing reel is provided by interlocking in the preset knob with a bridge plate. Spring-biased pins engage depressions in the mating face of an axially moveable means in the mechanism. By depressing the knob, the knob can be rotated. When at rest, the knob is locked against rotation.

4 Claims, 6 Drawing Sheets

PUSH TO TURN LOCKING PRESET KNOB FOR FISHING REEL

BACKGROUND OF THE INVENTION

1. Field of the Invention

This invention relates to fishing reels and, in particular, to a mechanism for locking the preset knob which controls the drag mechanism of the reel.

2. Description of the Prior Art

In the prior art, it is common to have drag mechanisms on fishing reels. One type of reel is known as a lever drag reel. In a conventional lever drag reel, a lever is used to vary the amount of drag force on the spool. There is usually a stop called "strike", another stop called "full", and a final stop called "free". At the free stop, the spool is in "free spool", or in other words, there is no drag on the spool. At the "strike" stop, the reel is providing a drag of approximately ⅓ the breaking strength of the line. At the "full" stop, the reel provides a drag of approximately ½ the breaking strength of the line.

Most reels are designed to be fished with various weight lines. Thus some method of adjustment is needed to vary the drag values at the "strike" and "full" positions. This is done through a preset adjustment system. All conventional lever drag reels have a preset adjustment system; which usually includes a set of threaded members.

It is very important that the preset doesn't change unless the user wishes it to. Vibration, mishandling and simply operation of the reel can knock the preset out of adjustment. Thus a locking preset is desirable.

In the prior art, there are many systems that lock the preset knob to prevent its rotation. All of these designs require some manipulation of the reel, such as pushing a button and turning a knob, to adjust the preset. This can be difficult to accomplish on a moving boat with wet and slimy hands. My design avoids these problems.

U.S. Pat. No. 5,863,007 describes a drag mechanism for a spinning reel. The locking preset mechanism is not a drag mechanism, but a means to prevent the accidental rotation of the preset knob during use of the reel.

U.S. Pat. No. 5,219,131 shows an electronic drag monitoring system. In the section view FIG. 1, a cam member "C" is shown. This member is nothing more than a cam or follower that is used in any conventional lever drag reel.

U.S. Pat. No. 3,184,179 uses a standard thumbnut to adjust the preset, as described in column 4, line 25–35. This patent discloses a basic lever drag reel design.

U.S. Pat. No. 4,871,129 is an alternative lever drag design. It has no provisions for preventing the preset knob from rotating accidentally while the reel is in use.

U.S. Pat. No. 4,852,826 shows yet another lever drag fishing reel design. This reel uses a rubber o-ring (not called out, between items 30 and 32 in FIG. 1) to retard the rotation of the preset knob. It does not preclude the rotation of the preset knob when the reel is in use, nor does it allow easy adjustment of the knob when the drag lever is in the free spool position. This is due to the friction between the rubber o-ring and the preset knob.

U.S. Pat. No. 5,601,245 shows yet another lever drag reel design. This design uses a lever rather than a knob to adjust the preset. As such, it makes no provision to prevent movement of the preset lever under drag; other than the friction between the various members. The same applies to U.S. Pat. No. 4,516,741.

U.S. Pat. No. 5,560,562 shows an unusual lever drag reel. This reel has no preset adjustment. Since it has no preset system, it has no provisions for a locking preset system.

The reel pictured in U.S. Pat. No. 5,297,756 uses the same preset knob mechanism as shown in U.S. Pat. No. 4,852,826. The same comments apply.

My prior U.S. Pat. No. 6,364,228 discloses a locking preset mechanism for a fishing reel provided by interlocking serrations in the preset knob face and the mating face of an axially moveable force transmitting means in the mechanism. In free spool, the knob can be rotated. In drag, the knob is locked against rotation.

SUMMARY OF THE INVENTION

To eliminate the accidental loosening of the preset knob, I have provided a mechanism for locking the preset knob while the reel is in a drag producing state and permitting the easy rotation of the preset knob when the reel is in the free spool condition.

More particularly, I provide in a fishing reel having a drag mechanism capable of being moved to a drag condition and to a free spool condition, the improvement comprising a locking means to prevent said knob from accidentally turning during use of said reel. I have invented a fishing reel having a drag mechanism capable of being moved to a drag condition and to a free spool condition, and having the force exerted by said drag mechanism pre-set by turning a knob, with the improvement comprising:

a preset locking means coacting with said knob to prevent said knob from accidentally rotating during use of said reel, said preset locking means comprising: a bridge plate having a hole therein defined by walls; said knob having cooperating means for mating with the walls and preventing rotation of the knob; a radial surface on said knob having spring-biased pins retained therein and extending therefrom; said bridge plate juxtaposed to said knob and having a radial surface in opposed relation to the radial surface on said knob; said bridge plate radial surface having depressions therein for engagement with said pins, such that when said preset knob is depressed axially, said knob can be easily rotated, and when said preset knob is in a rest condition, said knob is in a locked non-rotating condition. The axial force exerted by said spring-biased pins is such that the pins and depressions are maintained in contact with one another, while permitting rotation of said knob.

The cooperating means further comprises a geometric shape on said knob and the walls of the hole in said bridge plate further comprise a geometric shape sized the fit in sliding engagement with said geometric shape on said knob.

DESCRIPTION OF THE PREFERRED EMBODIMENTS

Figure 1:
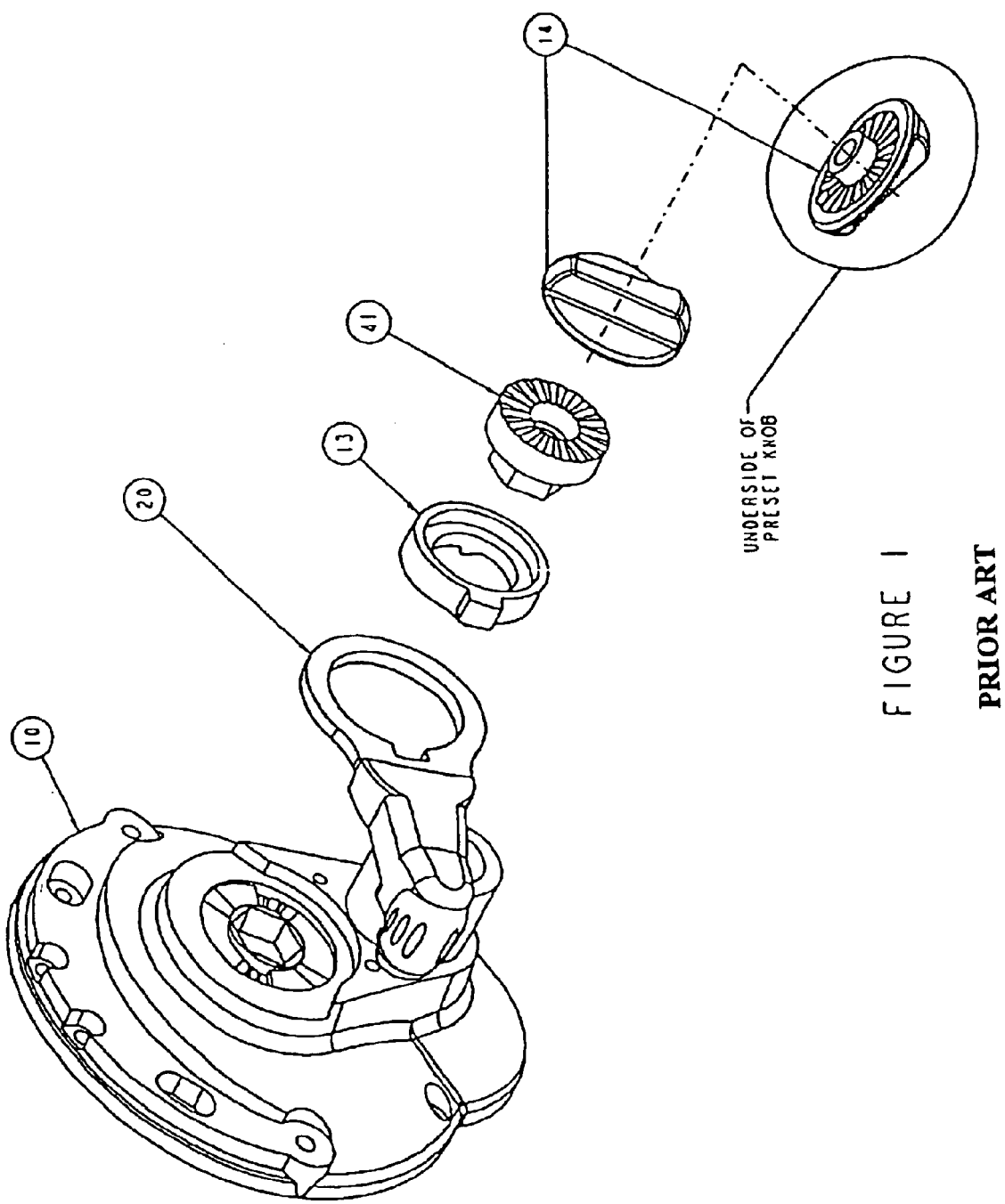
FIG. 1 is an exploded perspective view of portions of a fishing reel showing a mechanism in accordance with my prior art U.S. Pat. No. 6,364,228.

Referring to the Figures, in the prior art, U.S. Pat. No. 6,364,228, FIG. 1, the preset of the drag is accomplished when the drag lever (20) is at the free spool position. The drag lever (20) is keyed to the cam (13). In my design, there is a transmitting member (41) that is keyed to the right side plate (10) of the reel to prevent rotation, while being allowed to move axially. This member transmits the axial motion of the cam to the preset knob (14). This transmitting member (41) has a series of serrations on the surface that contact mating set of serrations on the preset knob (14).

Figure 2:
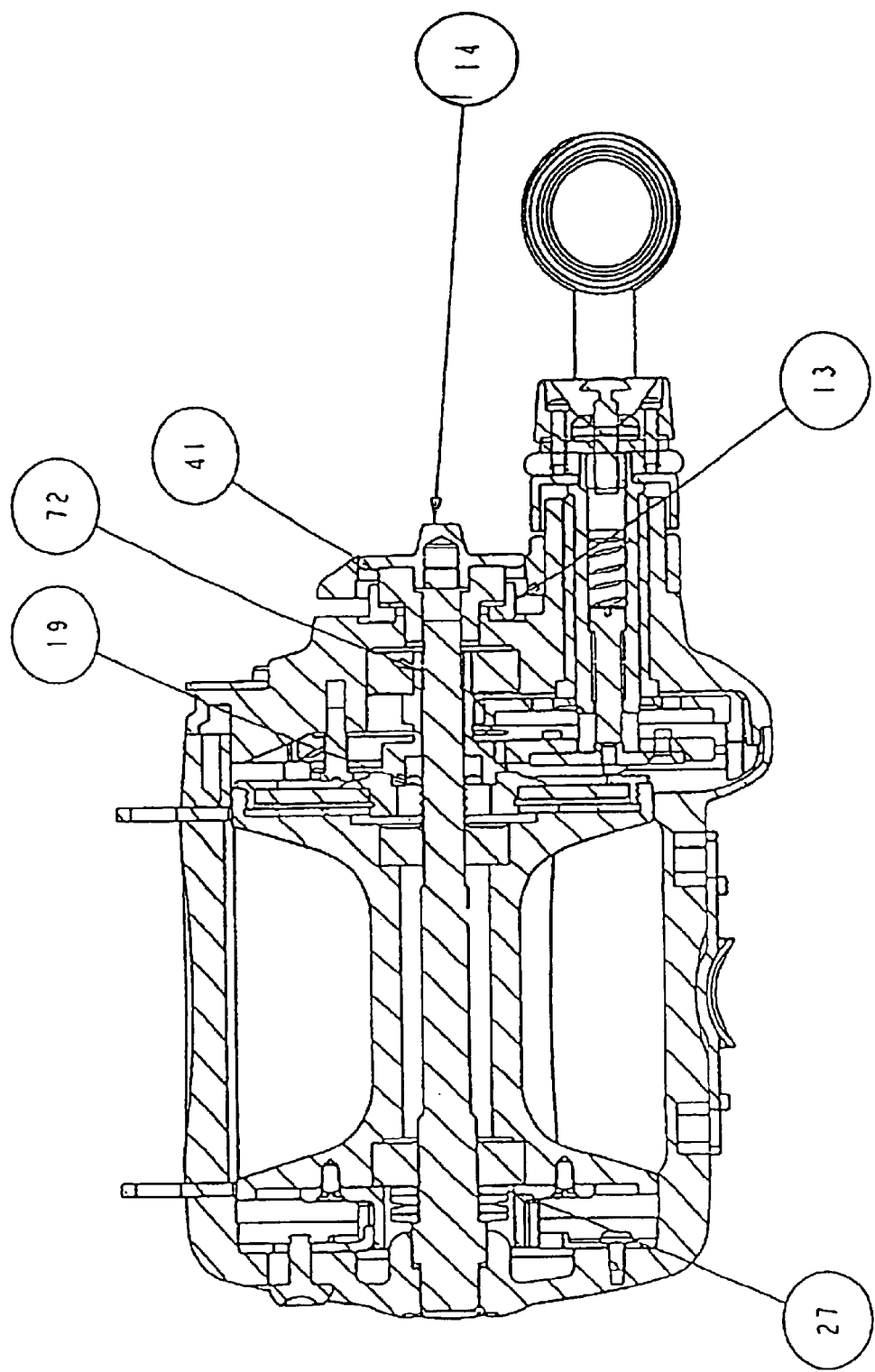
FIG. 2 is a section of a fishing reel also showing the parts of my prior art patent as shown in FIG. 1, assembled.

The preset knob (14) and the transmitting member (41) are kept in contact with one another either by the Belleville springs (27 FIG. 2), or the drag member separation spring (19 FIG. 2), depending on the position of the drag lever (20).

When the drag lever (20) is in the free spool condition, the Belleville springs (27) are exerting no force in the reel. Only the drag member separation spring (19) is exerting any axial force. This spring keeps the serrated surfaces of the preset knob (14) and the transmitting member (41) in contact, but its axial force is much lighter than that of the Belleville springs (27). The serrations combined with the light axial force of the drag member separation spring (19) provide slight resistance to rotation of the preset knob (14). When the user turns the preset knob (14), this axial force is overcome by the camming action of the mating serrations on the preset knob (14) and the transmitting member (41). The serrations will ride up and over one another, thus allowing rotation of the knob.

When the drag lever (20) is in any other position (other than free spool), the bulk of the axial forces in the reel are created by the Belleville springs (27). These axial forces are much greater than those caused by the drag member separation spring (19). If the user tries to turn the preset knob (14), the cam action of the serrations will not provide enough mechanical advantage for the user to overcome the axial force of the Belleville springs (27) and thus the serrations will not be able to ride up and over one another. The preset knob (14) is now "locked" and thus prevents accidental rotation.

The present inventionis different from the invention shown in U.S. Pat. No. 6,364,228.

Figure 3:
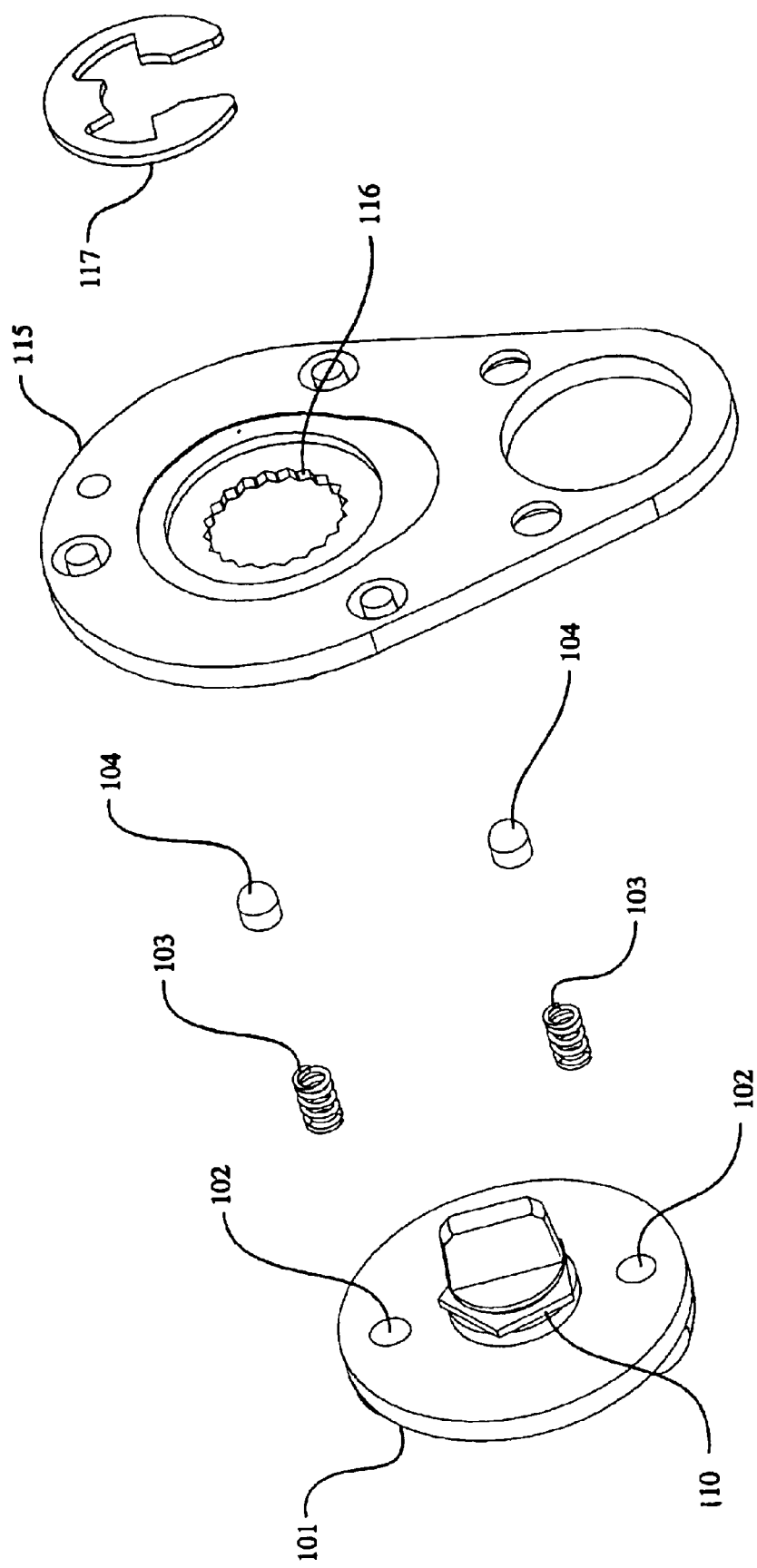
FIG. 3 is an exploded perspective view of portions of a fishing reel showing a mechanism in accordance with the present invention.
Figure 4:
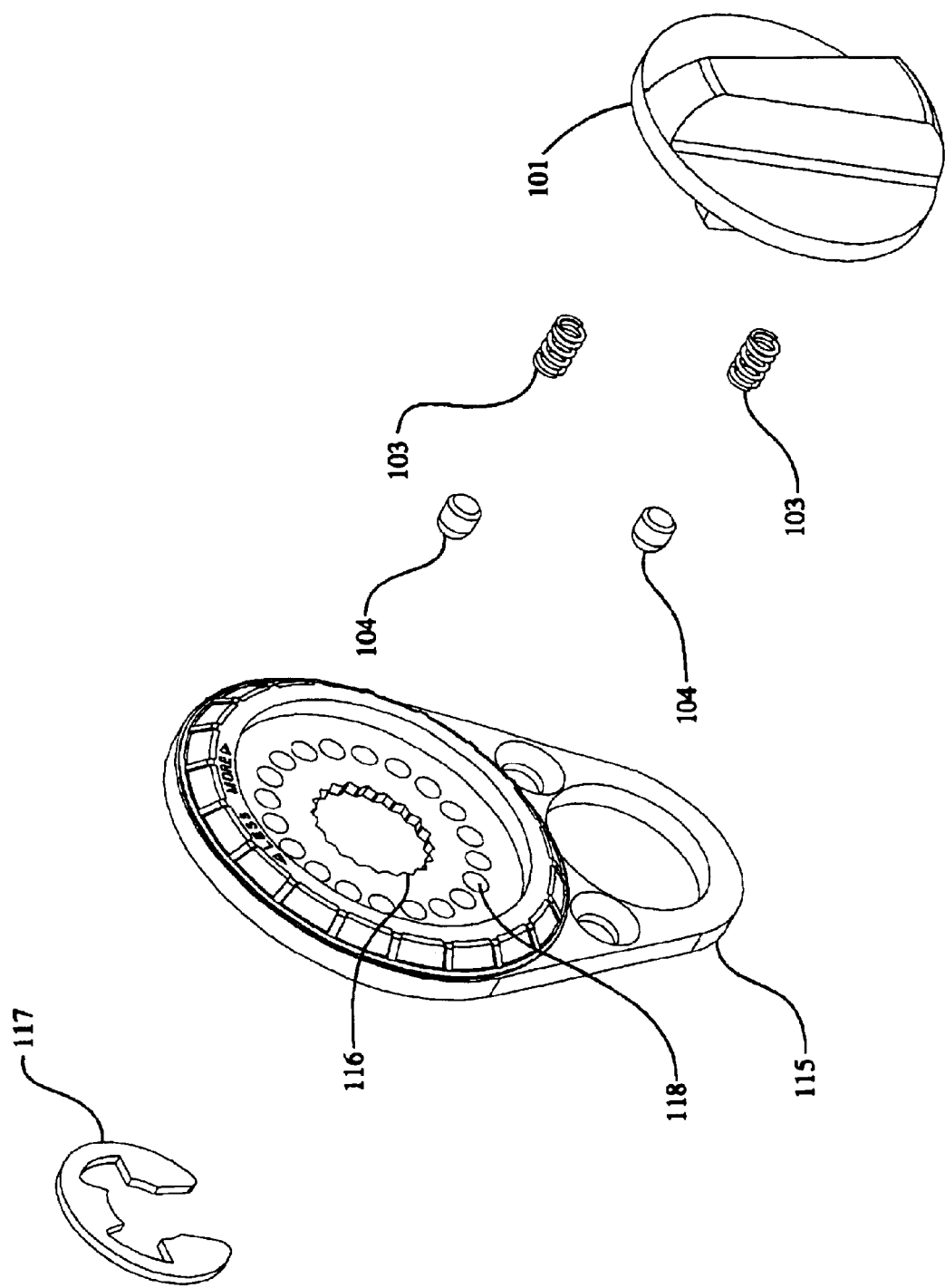
FIG. 4 is an exploded perspective view of portions of a fishing reel showing a mechanism in accordance with the present invention.
Figure 5:
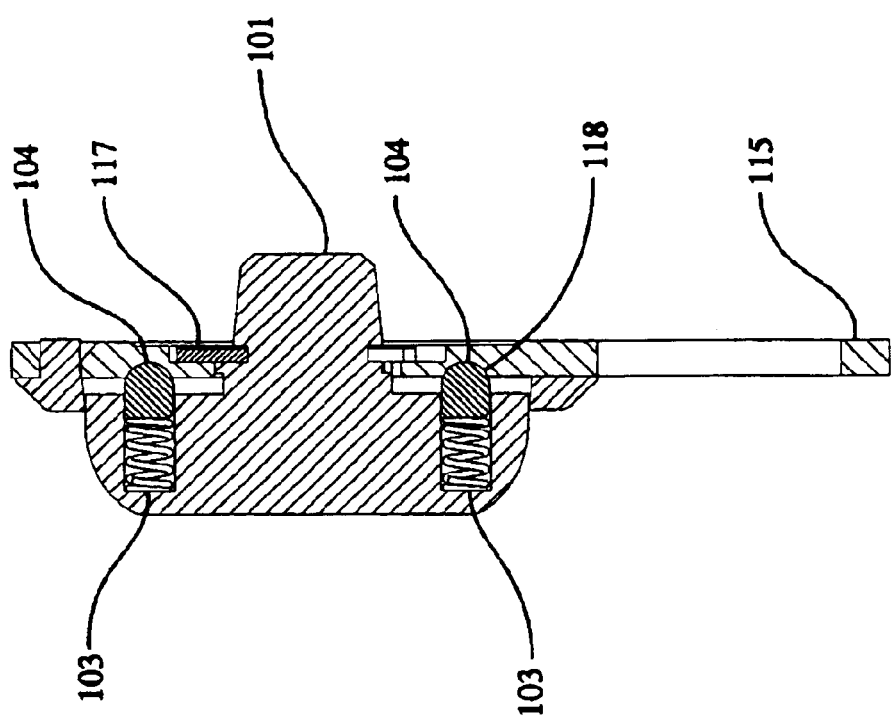
FIG. 5 is a section of a fishing reel also showing the parts in FIGS. 3 and 4, assembled.

In my present design, as shown in FIGS. 3, 4 and 5, there is a preset knob 101. There are two holes 102 in the preset knob, each of which contain a spring 103 and pin 104. The preset knob 101 has a geometric shape of a pentagon on the shank of the knob as at 110. This preset knob is installed into a bridge cover 115. There is a hole 116 in the bridge cover 115. The walls forming the hole accept, in a sliding fit, the geometric shape 110 on the preset knob. When these two parts are engaged, the preset knob cannot rotate. The preset knob 101 is retained in the bridge cover 116 by a retaining ring 117. When assembled, the pins 104 sit in depressions 118 in the bridge cover 115. The springs 103 are slightly compressed in this state.

When the preset knob is not in use, the geometric shape 110 of the preset knob 101 is engaged within the hole 116 with the bridge cover 115. When the user wishes to turn the preset knob, the user must push the preset knob axially so that the springs 103 are further compressed. This axial motion disengages the geometric shape 110 from the bridge cover 115, allowing the preset knob to turn. Rotation of the preset knob in this state further compresses the springs 103 as they ramp out of the depressions 118 in the bridge cover 115. As the preset knob is further rotated, the pins drop into the next set of depressions 118, creating a clicking sound and sensation. These depressions 118 are positioned such that when the user is not operating the preset knob 101, the axial force due to the compressed springs 103 will urge the pins 104 into the depressions 118 on the bridge cover 115 and align the geometric shape 110 on the preset knob 101 with the corresponding hole 116 in the bridge cover 115, allowing the preset knob to move axially and re-engage the geometric shape 110 with the walls forming the hole 116 in the bridge cover 115.

Figure 6:
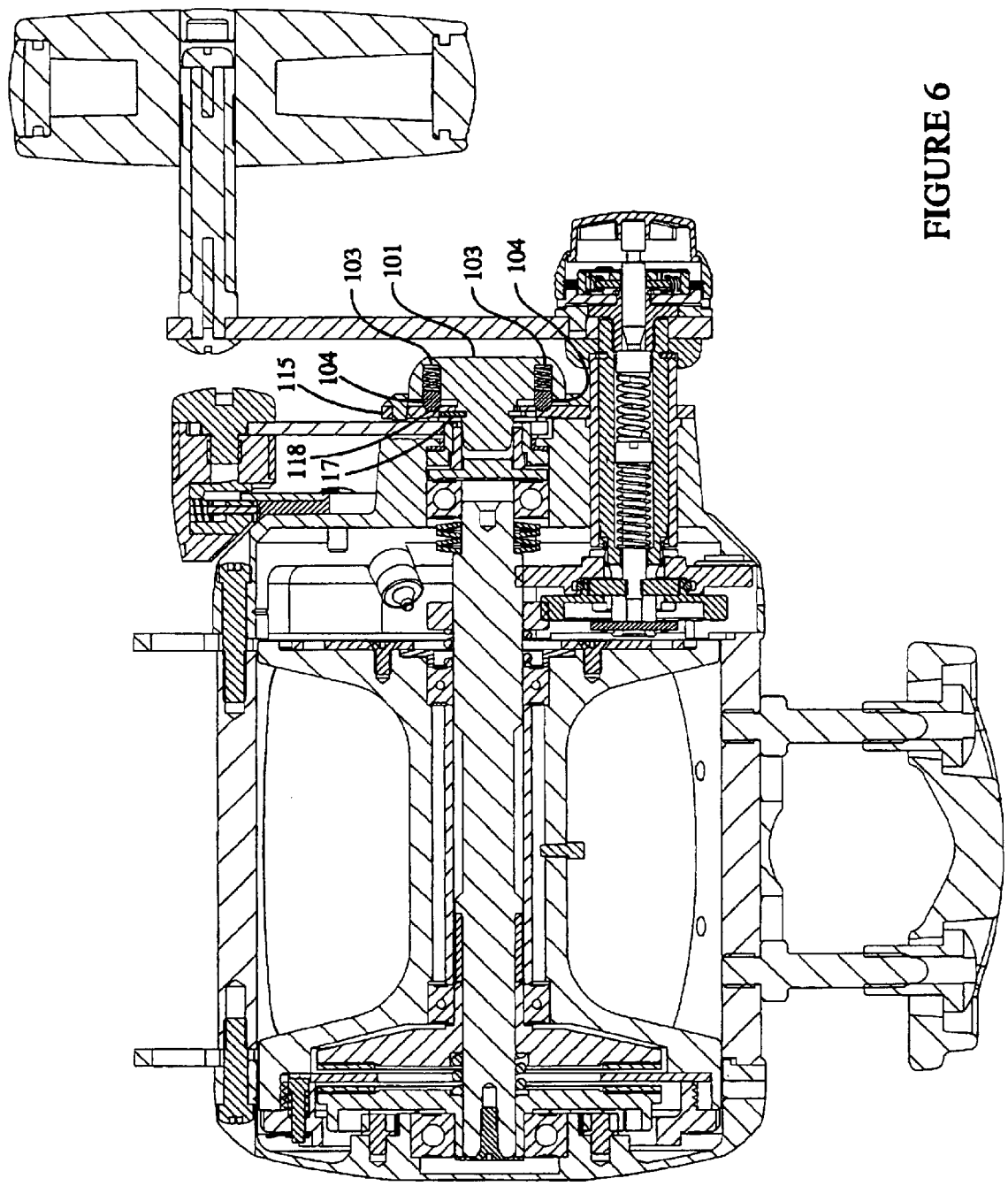
FIG. 6 is a section of a fishing reel also showing the parts in FIGS. 3 and 4, assembled, in a reel.

FIG. 6 shows the parts in cross section, assembled in a reel.

If the depressions 118 are left out of the design, the system may still work; but the reengagement of the preset knob with the bridge cover will not be as precise and may require user intervention (i.e., rotating the knob until the preset knob engages with the bridge cover).

What is claimed is:

1. In a fishing reel having a drag mechanism capable of being moved to a drag condition and to a free spool condition, and having the force exerted by said drag mechanism pre-set by turning a knob, the improvement comprising:

a preset locking means coacting with said knob to prevent said knob from accidentally rotating during use of said reel, said preset locking means comprising: a bridge plate having a hole therein defined by walls; said knob having cooperating means for mating with the walls and preventing rotation of the knob; a radial surface on said knob having spring-biased pins retained therein and extending therefrom; said bridge plate juxtaposed to said knob and having a radial surface in opposed relation to the radial surface on said knob; said bridge plate radial surface having depressions therein for engagement with said pins, such that when said preset knob is depressed axially, said knob can be easily rotated, and when said preset knob is in a rest condition, said knob is in a locked non-rotating condition.

2. The reel of claim 1 wherein the axial force exerted by said spring-biased pins is such that the pins and depressions are maintained in contact with one another, while permitting rotation of said knob.

3. The reel of claim 1 wherein the cooperating means further comprises a geometric shape on said knob.

4. The reel of claim 3 wherein the walls of the hole in said bridge plate further comprise a geometric shape sized the fit in sliding engagement with said geometric shape on said knob.

* * * * *